United States Patent [19]
Gerum

[11] Patent Number: 5,787,624
[45] Date of Patent: Aug. 4, 1998

[54] LARGE-FORMAT SLIDE MOUNT

[76] Inventor: Jakob Gerum, Oldenburggasse 41, A-1230 Wien, Austria

[21] Appl. No.: 778,999

[22] Filed: Jan. 3, 1997

[30] Foreign Application Priority Data

Jan. 4, 1996 [AT] Austria ........................ 16/96

[51] Int. Cl.⁶ ........................................ A47G 1/06
[52] U.S. Cl. ........................ 40/706; 40/710; 40/781
[58] Field of Search ................ 40/701, 706, 707, 40/710, 781

[56] References Cited

U.S. PATENT DOCUMENTS

| | | | |
|---|---|---|---|
| 2,527,765 | 10/1950 | Roehrl | 40/701 |
| 3,235,991 | 2/1966 | Harper et al. | 40/707 X |
| 3,470,644 | 10/1969 | Craig | 40/706 |
| 3,949,505 | 4/1976 | Kato | 40/706 |
| 3,973,344 | 8/1976 | Frankel | 40/706 |
| 3,974,582 | 8/1976 | Jantzen, Jr. | 40/710 |
| 4,104,818 | 8/1978 | Hrabik | 40/707 |
| 5,544,438 | 8/1996 | Fazekas | 40/781 X |

*Primary Examiner*—Donald P. Walsh
*Assistant Examiner*—William A. Rivera
*Attorney, Agent, or Firm*—Herbert Dubno; Andrew Wilford

[57] ABSTRACT

A slide mount for a transparency has a generally rectangular and annular back frame formed with front and back faces terminating outwardly at four straight outer sides, a central window, an annular row of mounting studs projecting from the front face around the window inward of the outer sides so that perforations in the transparency fit over the studs with the slide spanned across the window, and an L-shaped lip extending along two of the outer sides and having an overhanging edge. The other two sides of the back frame are plain. A generally rectangular and annular front frame geometrically similar to the back frame is formed with front and back faces terminating outwardly at four outer sides, a central window, an annular row of recesses in the respective back face around the respective window inward of the respective outer sides, and an L-shaped lip extending along two of the respective outer sides and having an overhanging edge. The other two respective sides are plain. Each recess is elongated and extends parallel to a direction itself extending diagonally of the front frame. The lips, studs, recesses, and sides are so positioned and dimensioned that the front and back frames can fit together with the studs engaged in the recesses, the windows aligned, a transparency engaged over the studs gripped between the front faces, and the plain sides of each frame engaged under the overhanging lip of the other frame.

8 Claims, 2 Drawing Sheets

LARGE-FORMAT SLIDE MOUNT

FIELD OF THE INVENTION

The present invention relates to a slide mount. More particularly this invention concerns a slide mount for large-format slides up to 18 cm on a side.

BACKGROUND OF THE INVENTION

A standard slide mount comprises a pair of rectangular window-forming frames that are sandwiched to opposite sides of a transparency. Even though the transparency itself is relatively delicate, the completed slide is durable and of a standardized size thanks to the more rigid frames holding it. For small-format, for instance 35 mm, transparencies the frames are made of cardboard or light plastic and can be glued or heat-sealed together.

When large-format, for instance 18 cm, slides are to be made up, it is necessary to provide a substantially more robust mount. Such slides are used for projecting advertising on the sides of buildings or for creating a background against which other images are projected.

Since such slides are normally used with very high-wattage lamps, it is necessary that they be extremely strong so that they do not deform when heated. Thus they are typically made up of a pair of matching metallic frames each formed along each of its four sides with four holes, the holes of the back frame being threaded. The transparency is punched with perforations that correspond to the holes in the frames.

Such a large-format slide is assembled by placing the transparency on the back frame, carefully setting the front frame in place over the transparency, and then securing the two frames together with 16 screws that pass through the holes in the transparency. Obviously setting and tightening all 16 screws is an onerous job, and if they are not tightened equally the transparency can slip when the assembly is heated, resulting in distortion of the projected image or text.

OBJECTS OF THE INVENTION

It is therefore an object of the present invention to provide an improved large-format slide mount.

Another object is the provision of such an improved slide mount which overcomes the above-given disadvantages, that is which is simple to assembly, inexpensive to manufacture, very durable, and even reusable.

SUMMARY OF THE INVENTION

A slide mount for a transparency has according to the invention a generally rectangular and annular back frame formed with front and back faces terminating outwardly at four straight outer sides, a central window, an annular row of mounting studs projecting from the front face around the window inward of the outer sides so that perforations in the transparency fit over the studs with the slide spanned across the window, and an L-shaped lip extending along two of the outer sides and having an overhanging edge. The other two sides of the back frame are plain. A generally rectangular and annular front frame geometrically similar to the back frame is formed with front and back faces terminating outwardly at four outer sides, a central window, an annular row of recesses in the respective back face around the respective window inward of the respective outer sides, and an L-shaped lip extending along two of the respective outer sides and having an overhanging edge. The other two respective sides are plain. Each recess is elongated and extends parallel to a direction itself extending diagonally of the front frame. The lips, studs, recesses, and sides are so positioned and dimensioned that the front and back frames can fit together with the studs engaged in the recesses, the windows aligned, a transparency engaged over the studs gripped between the front faces, and the plain sides of each frame engaged under the overhanging lip of the other frame.

Thus with this system the mount can be assembled without tools. Once assembled the two L-shaped ridges will ensure solid interconnection of the two frames around their four sides. Although according to the invention screws are engaged through the frames to secure them together, only four screws, in the corners or the middles of the sides, are sufficient to make the finished slide very robust.

According to the invention the lips have angled inner faces and the plain sides have complementarily beveled edges. In addition at least one recess on each side of the front frame is provided with means including formations engageable with the respective stud for positively securing the two frames together. To this end the one recess on each side has a pair of confronting sides one of which is formed with an inwardly projecting bump constituting the respective formation. Alternately the one recess on each side is generally keyhole shaped.

The studs in accordance with the invention lie on respective angularly equispaced radii extending from a center of the respective window with adjacent radii at angles or 4° to 5° to each other. Thus if the transparency expands, as is standard, it will not wrinkle between some of the studs due to differential expansion.

BRIEF DESCRIPTION OF THE DRAWING

The above and other objects, features, and advantages will become more readily apparent from the following description, reference being made to the accompanying drawing in which.

SPECIFIC DESCRIPTION

Figure 2:
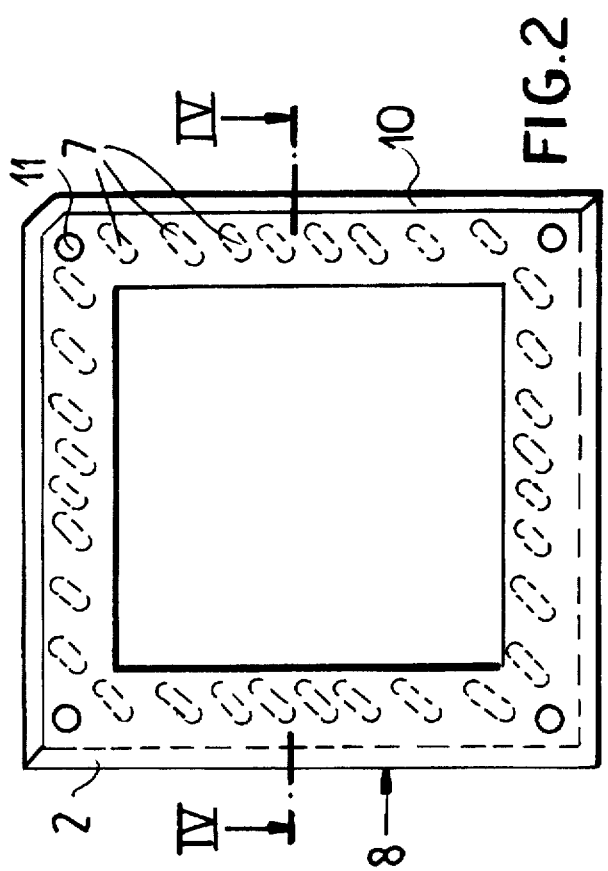
FIGS. 1 and 2 are front views of the two parts of a slide mount according to the invention.
Figure 4:
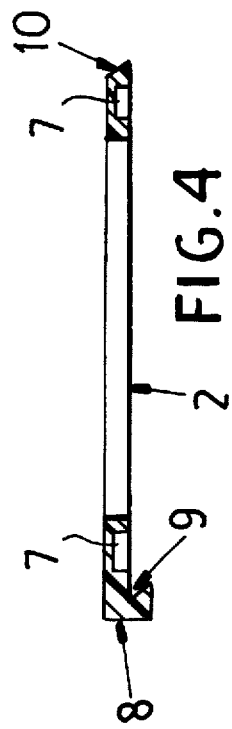
FIGS. 3 and 4 are sections taken along respective lines III—III and IV—IV of respective FIGS. 1 and 2.

As seen in FIGS. 1 through 6 a slide mount is comprised of two geometrically similar frames 1 and 2 molded of polyphenylene sulfide, both of annular rectangular shape about 18 cm on a side. The frame 1 is formed around its center window 17 on its front face with an annular row of short cylindrical pegs or studs 3 that normally pass through identically spaced perforations on a transparency partially shown at 18. The studs 3 each lie on a radius r from a center C of the window 17 and the radii r are angularly equispaced so the studs 3 are more closely spaced in the middles of the sides than at the corners. In addition the frame 1 is formed along two of its sides on its front face with a forwardly projecting L-shaped ridge or lip 4 having an outwardly angled or dove-tail shaped inner surface 5 giving it an overhang. Its other two sides are plain and beveled at 6 complementary to the surface 5.

The frame 2 is generally complementary to the frame 1 and is formed of the same plastic. Its back face is formed with a row of diagonally extending recesses or slots 7 into which the studs 3 can engage, these slots 7 extending parallel to each other at 45° to the straight sides of the frame 2. In addition, like the frame 1, this frame 2 is formed along two of its sides on its back face with a backwardly projecting L-shaped ridge or lip 8 having an outwardly angled or dove-tail shaped inner surface 9. The other two sides are plain and beveled at 10 complementary to the surface 9. Both frames 1 and 2 are formed in each of their corners with a mounting hole 11.

Figure 6:
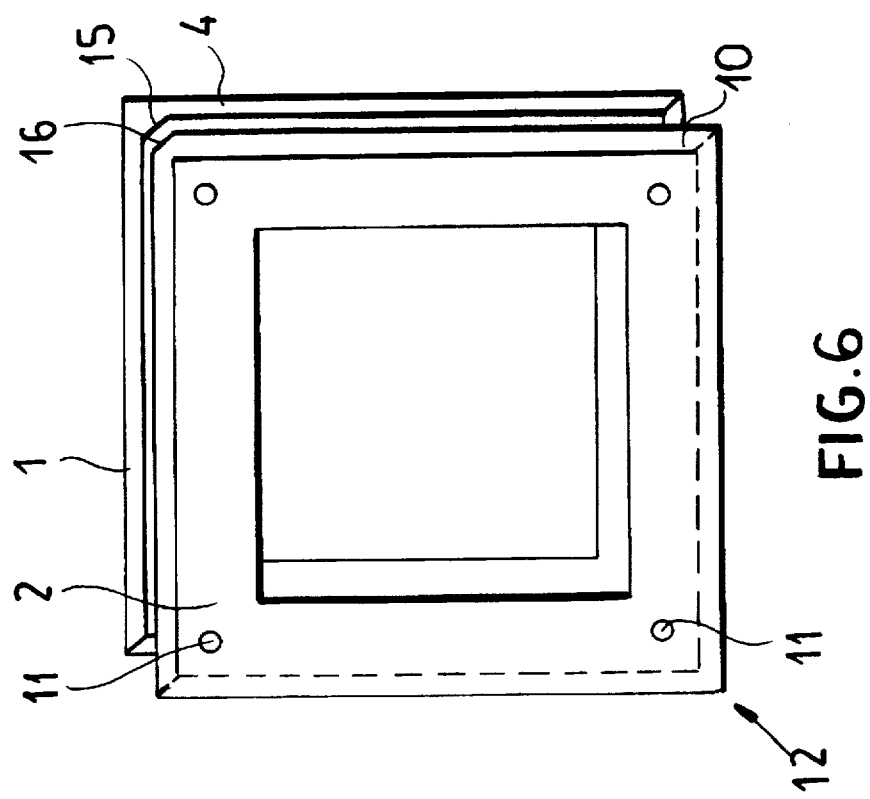
FIG. 6 is a front view showing the two parts as they are being assembled together.

It is therefore possible to set a transparency 18 on the studs 3 and then rest the back face of the frame 2 on the front face of the frame 1 in the diagonally offset position shown in FIG. 6. This engages the studs 3 in the inner ends of the slot recesses 7. The front frame 2 is then pushed diagonally in the direction of arrow 12 so that the edge 10 fits under the lip 4 and the edge 6 engages under the lip 8, solidly connecting the two frames 1 and 2 together all around their peripheries. During such relative sliding of the frames 1 and 2 the transparency 18 is held in position by the studs 3. Screws 19 are then inserted through the holes 11 to secure them permanently together.

Figure 5:
FIG. 5 is a cross section through an assembled slide mount according to the invention.
Figure 1:
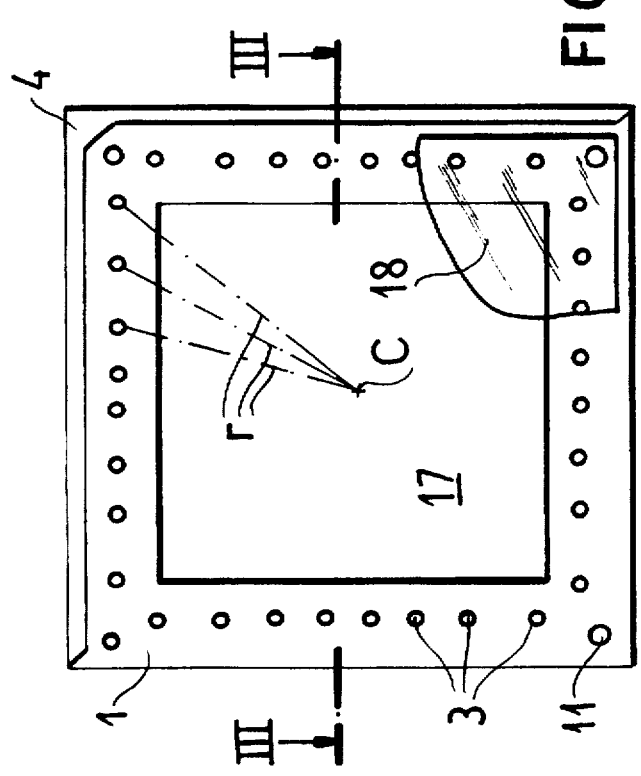
Figure 3:
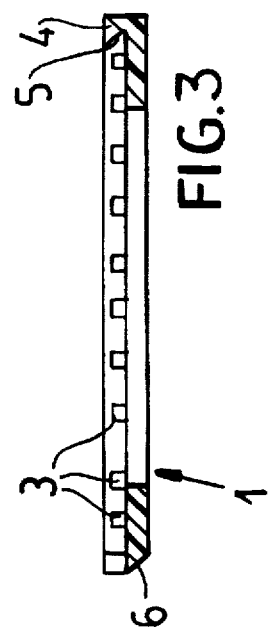

The frames 1 and 2 have confronting beveled corners 15 and 16 that in the assembled slide shown in FIG. 5 are diagonally slightly spaced from each other. Thus a screwdriver or the like can be inserted between the corners to pry them apart opposite to the direction 12 if the holder is to be reused.

Figure 7:
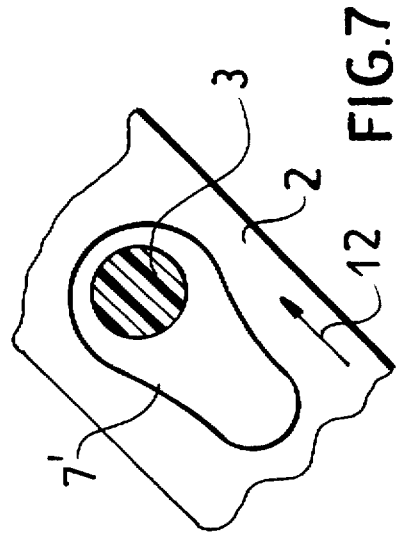
FIGS. 7 and 8 are large-scale views of alternate details of the instant invention.

It is possible as shown in FIG. 7 to form the frame 2 with slots 7 of slightly keyhole shape, that is much wider at their inner ends than at their outer ends. In fact at their outer ends the slots 7 have a width equal to the diameter of the studs 3 so that, while it is easy to fit the frame 2 over the frame 1 when they are offset, when pushed together the studs 3 will lodge tightly in the narrow outer ends of the slots 7 to make a solid connection.

Figure 8:
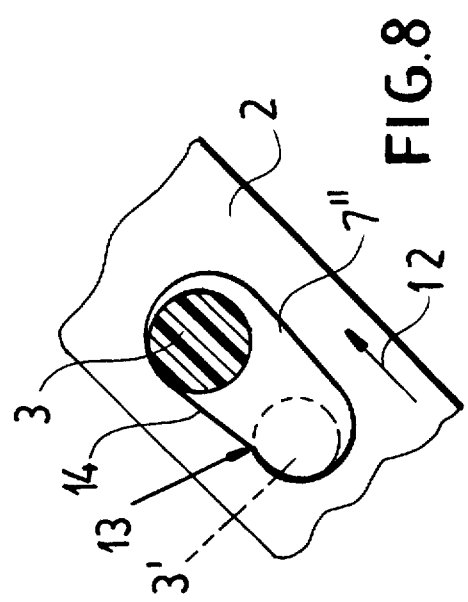

Alternately as shown in FIG. 8 the frame 2 is formed with a slot 7" whose one side 14 is formed with a bump. Thus as the stud moves from the inner end to the outer end, into a position indicated at 3', it must move past this bump 13, thereby elastically outwardly deflecting the side of the frame somewhat. Once it reaches the end position 3' the outwardly deflected side can move back in, thereby elastically locking the two frames 1 and 2 together.

I claim:

1. A slide comprising:
    a transparency having edges formed with throughgoing perforations;
    a generally rectangular and annular back frame formed with
        front and back faces terminating outwardly at four outer sides,
        a central window,
        an annular row of mounting studs projecting from the front face around the window inward of the outer sides, the perforations in the transparency fitting over the studs with the transparency spanned across the window and lying against the back-frame front face, and
        an L-shaped lip having two straight legs meeting at a corner of the back frame, each extending along a respective one of two of the outer sides, and each having an overhanging edge, the other two sides being plain;
    a generally rectangular and annular front frame geometrically similar to the back frame and formed with
        front and back faces terminating outwardly at four outer sides,
        a central window,
        an annular row of recesses in the respective back face around the respective window inward of the respective outer sides, the recesses each receiving a respective one of the studs, each recess being elongated and extending parallel to a direction itself extending diagonally of the front frame, and
        an L-shaped lip having two straight legs meeting at a corner of the front frame, each extending along a respective one of two of the front-frame outer sides, and each having an overhanging edge, the other two front-frame sides being plain, the front frame being movable on the back frame in the direction with the studs engaged in the respective recesses, and
    means for holding the front and back frames together with the studs engaged in the recesses, the windows aligned, the transparency engaged over the studs and gripped between the back-frame front face and the front-frame back face, and the plain sides of each frame engaged under the overhanging lips of the other frame.

2. The slide defined in claim 1 wherein the holding means includes screws engaged through the frames and securing the frames together.

3. The slide defined in claim 1 wherein the lips have angled inner faces and the plain sides have complementarily beveled edges.

4. The slide defined in claim 1 wherein at least one recess on each side of the front frame is provided with formations engageable with the respective stud and forming the holding means.

5. The slide defined in claim 4 wherein the one recess on each side has a pair of confronting sides one of which is formed with an inwardly projecting bump constituting the respective formation.

6. The slide defined in claim 4 wherein the one recess on each side is generally keyhole shaped.

7. The slide defined in claim 1 wherein the studs lie on respective angularly equispaced radii extending from a center of the respective window.

8. The slide defined in claim 1 wherein the frames are each integrally made of polyphenylene sulfide.

* * * * *